United States Patent [19]
Kilham

[11] Patent Number: 4,462,337
[45] Date of Patent: Jul. 31, 1984

[54] BIRD FEEDER WITH ROTATABLE COVER
[76] Inventor: Peter Kilham, Mill Rd., Foster, R.I. 02825
[21] Appl. No.: 468,175
[22] Filed: Feb. 22, 1983
[51] Int. Cl.³ .......................................... A01K 39/00
[52] U.S. Cl. .................................. 119/51 R; 119/63
[58] Field of Search ............... 119/51 R, 23, 52 R, 119/63

[56] References Cited
U.S. PATENT DOCUMENTS

| | | | |
|---|---|---|---|
| 2,826,171 | 3/1958 | Piel | 119/51 R |
| 2,841,116 | 7/1958 | Nichols et al. | 119/51 R |
| 3,901,192 | 8/1975 | Adams | 119/51 R |
| 4,030,451 | 6/1977 | Miller | 119/51 R |
| 4,361,116 | 11/1982 | Kilham | 119/51 R |

Primary Examiner—Jay N. Eskovitz
Attorney, Agent, or Firm—Robert J. Doherty

[57] ABSTRACT

A bird feeder having a generally planar seed tray and means for mounting such in a generally horizontal position. The bird feeder further includes a cover, generally of dome-shaped configuration and having a lower peripheral edge frictionally supported on an upstanding peripheral seed tray rim. The cover is capable of rotational movement with respect to the tray such that a bird access opening in the cover may be adjustably positioned downwind of the feeder in its use position.

14 Claims, 4 Drawing Figures

U.S. Patent  Jul. 31, 1984  4,462,337
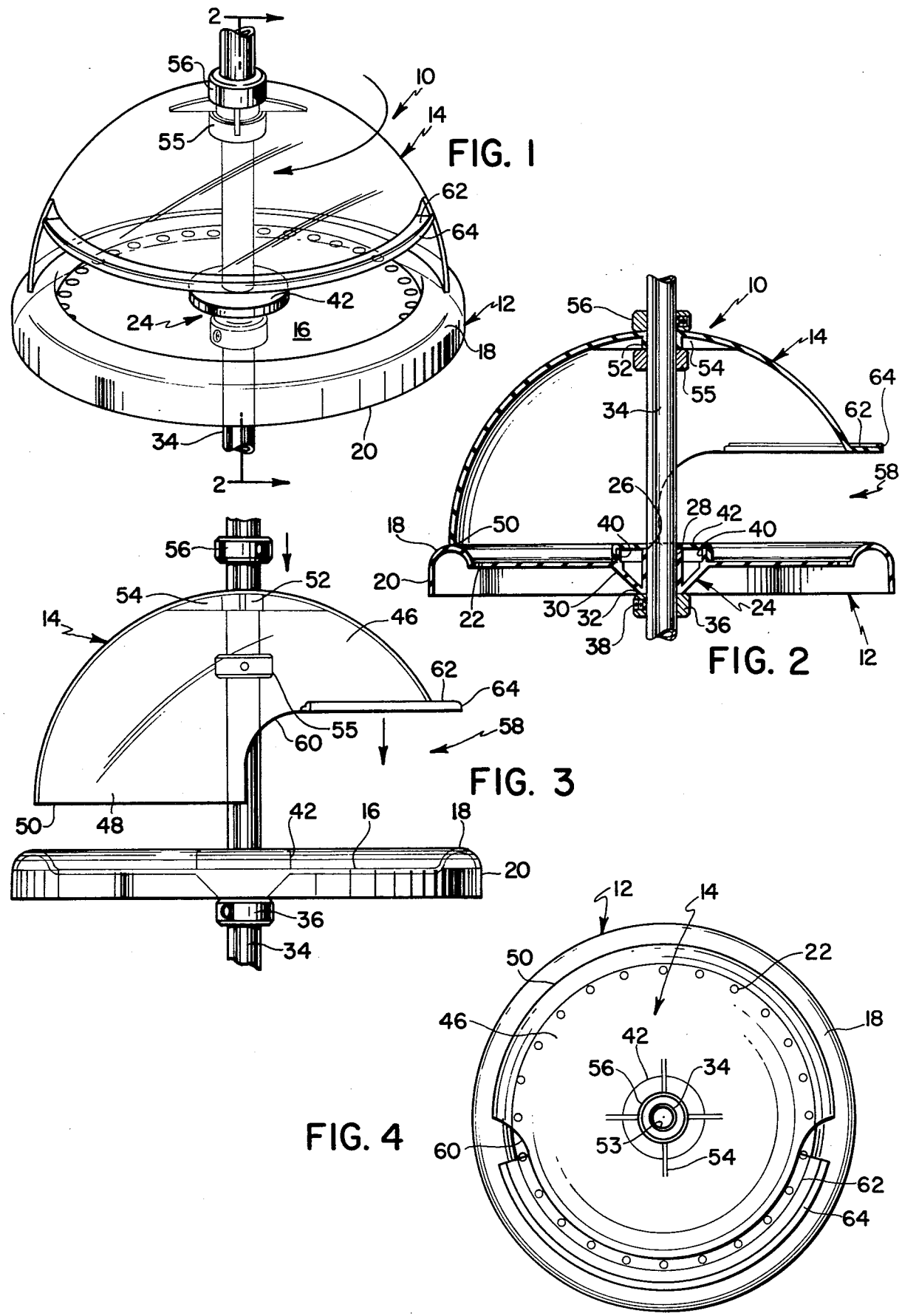

BIRD FEEDER WITH ROTATABLE COVER

BACKGROUND AND OBJECTS OF THE INVENTION

This invention is directed to a bird feeder and more particularly to a bird feeder of novel construction which simultaneously accomplishes several common objectives of bird feeders in general. One such common objective is to produce a feeder which successfully denies easy access to undesirable, i.e., aggressive, bird species such as blue jays, starlings, and grackles yet permit relatively easy access for feeding to more timid and generally considered desirable species such as chickadees, titmice, and finches. Bird feeders which successfully accomplish this objective are known and include those which suspend a seed container beneath a cover and regulate the spacing between the respective upper and lower portions thereof such as that shown in U.S. Pat. No. 4,102,308 issued July 1978 to the present applicant. Despite the usefulness of such known feeder constructions, there is a desire on the part of those who enjoy feeding and watching birds to utilize various uniquely constructed feeders in an attempt to enhance the enjoyment of such activity and in an attempt to attract a wider variety of bird species. Accordingly, the present invention is directed to such a uniquely constructed bird feeder which achieves the selective feeding of smaller, less aggressive bird species while discouraging or preventing the feeding of larger more aggressive species.

Another commonly encountered problem in the utilization of bird feeders is that many constructions are susceptible to having the seed placed therein blown out of the seed tray or container by the wind. This undesirably results in the scattering of the seed on the ground where it is either wasted or available to larger generally less desirable bird species and to squirrels and other pests. Accordingly, a further object of the present invention is the provision of a bird feeder which protects the seed feeding tray thereof from being blown away by the wind.

The above indicated as well as other desirable objectives are accomplished by the present invention by the provision of a bird feeder comprising a seed tray having a seed distribution and bird feeding surface, a peripheral surface surrounding said feeding surface and means for mounting said tray in a generally horizontal attitude, a cover forming a generally imperforate upper surface terminating in a lower terminal edge, said cover positioned above said seed tray with said terminal edge thereof in supporting contact with said seed tray peripheral surface, said cover including a bird access opening at one side thereof, said cover supported on said tray and freely rotationally movable with respect thereto such that said access opening is positionable on the downwind side of said feeder when in use position.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a perspective view of a preferred constructional embodiment of the bird feeder of the present invention;

FIG. 2 is an elevational section view taken along the line 2—2 of FIG. 1;

FIG. 3 is an elevational view showing the manner in which the feeder may be assembled; and FIG. 4 is a top plan view thereof.

DESCRIPTION OF THE INVENTION

Referring now to the drawing, the bird feeder 10 of the present invention includes a seed tray 12 and a cover 14. The seed tray includes a seed distribution and bird feeding surface 16 of generally planar configuration having an upstanding peripheral rim or lip 18 terminating in a downwardly extending flange 20. In the preferred embodiment the seed tray 12 is circular and the rim 18, a circumferential extension thereof. The central surface portion 16 of the tray may additionally be provided with a plurality of drain or weep holes 22 preferably extending in a circular pattern inwardly of the rim 18. The cross-sectional configuration of the rim is generally of an inverted U-shape, the uppermost portion of which extends above the central tray portion 16. Additionally, the rim is of a relatively wide extent, that is, the circular portion thereof has a relatively long curvature, i.e., on the order of 1 to $1\frac{1}{2}$ inch radius. This shape forms a surface which is relatively easy for small birds to light upon but which does not form a grasping perch for either small birds or large birds because of the relatively large radius or shallow curvature thereof. The tray 12 may be formed of any convenient, relatively stiff material, i.e., a plastic resinous material such as polycarbonate, butyrate, acrylics, and the like and is preferably transparent or translucent.

The central portion of the tray 12 includes a mounting assembly 24 having an opening 26 defined by a tubular member 28 integrally connected to the tray by means of a downwardly directed conical base 30 which terminates at its lower end in a circular edge surface 32. A rod, post or other relatively rigid member 34 is adapted to extend through the tubular opening 26 so as to position the tray 12 in a use position. In this regard, the member 34 may be suspended from above by connection by any suitable means to a tree, line, or the like or may be similarly driven into the ground as a stake or otherwise be conventionally supported. In any case, a collar 36 having an adjustable threaded set screw 38 may be fixedly engaged to the post 34 in such a manner that the tray rests thereon by mutual contact between the collar 36 and the edge surface 32 such that the vertical height of the tray vis-a-vis the post 34 is fixed. The inner surface 16 of the tray may further be provided with an upstanding circular collar 40 over which a generally cup-shaped protective cap 42 may be engaged so as to effectively prevent seeds and other debris from working its way into the tubular opening 26 and undesirably affecting the ability of the tray 12 to adjustably slide and rotate thereon in the intended manner.

The cover 14 which may be formed of the same materials as the tray 12 is preferably of a dome-shaped configuration, that is, it exhibits a generally imperforate upper surface 46 and includes at least one downwardly extending wall portion 48 which terminates in a terminal edge 50. Such peripheral edge 50 is generally coextensive with an adapted to be superposed with respect to the rim 18. The edge 50 may contact the rim and in some cases be supported on the tray 12 for frictional engagement therewith. The upper part 46 of the cover 14 is provided with a downwardly extending tubular member 52 having a top opening 53 through which the member 34 is adapted to extend. Inasmuch as the cover opening 53 due to forming procedures is usually of a somewhat greater diameter than that of rod 34 and would accordingly permit some tilting of the cover, a collar 55 similar to collar 36 is clamped onto rod 34 so as to position the cover just above or in slight contact with the rim 18. In this regard slight dimensional variations in the cover edge 50 normally dictate that the cover be supported by the collar 55 rather than the rim 18 although the latter support manner is acceptable so long as those dimension variations do not cause excessive tip or rocking of the cover upon the tray.

In this way then, the cover 14 is positioned in the intended manner with respect to the tray 12. Reinforcing ribs 54 serve to stiffen the tubular member 52. An upper collar 56 similar to collars 36 and 55 may be secured to the member 34 immediately above the cover 14 so as to insure that the cover cannot be inadvertently removed or blown upwardly off the tray component of the feeder 10.

An access opening 58 such that birds may enter through the cover and onto the central surface 16 of the tray 12 where the seed is stored is provided through the cover 14. Such opening is preferably in the form of a relatively large open slot or cut-a-way portion 60 of equal vertical height throughout its lateral extent and extending to opposite sides of the cover 14. In the preferred embodiment wherein the cover is in the shape of a semi-spherical dome, the cut-out portion 60 assumes the shape of a chordal section. In addition, the circumferential extent of the cut-out portion 60 is preferably about 180° or less such that a major imperforate lower portion 48 of the cover 14 may be oriented towards the wind in the use position of the feeder. This insures that the wind is diverted from the central surface 16 of the tray 12 so as to prevent the seed distributed thereon from being blown away and to keep snow and rain from being blown in. Such feature, in addition, provides a degree of protection to the birds feeding thereon or in some cases preliminarily lighting on the rim 18 prior to moving into the feeding surface 16. In addition, the central feeding surface as previously indicated is depressed relative to the rim 18 which further contributes to its protection from the wind.

Generally it is intended that the cover 14 be manually positioned with regard to the prevailing wind direction although an outwardly extending rudder or other wind activated mechanism so as to automatically turn the cover with respect to the wind can be utilized. Generally however, continual or at least unexpected movement detracts from the overall operation of a bird feeder since it tends to frighten the birds.

Also dependent on the species desired to be attracted, the vertical height of the cut-out access opening 60 is designed to be between about 2 and 3 inches although obviously other dimensions can be used. Other dimensional modifications of the overall bird feeder of this invention can be made to achieve particular results. In use the smaller birds have direct access to the feed surface 16 by flying through the access opening 60. It is not necessary that the small birds temporarily light upon that portion of the rim oriented with the opening 60; and generally the rim, by reason of its aforementioned large curvature doesn't provide a perch for the small birds. In any event the dimensions of the opening prevent larger birds such as blue jays from flying through the opening and the rim denies them a perch. In addition, the configuration of the tray 20 prevents squirrels from reaching the feed surface from below in that its planar extent and wide radius rim 18 prevent grasping. Also the wide dome-like configuration of the cover aids in preventing squirrel attack from above. In that regard, it is advantageous to mount the feeder at the top of the post 34. Thus the feeder 10 functions to feed small birds and prevent access to larger birds and squirrels.

The upper portion of the cut-out 60 is preferably provided with an outwardly extending flange or ridge 62 terminating in a thickened bead 64 of a relatively small dimension so as to function as a rain gutter. In addition, the flange by extending over at least a portion of the rim 18 of the tray 12 prevents rain, slush, and the like from directly falling or sliding onto the small birds which have alighted thereon preliminary to entering the feeding surface 16. The bead 64 tends to divert water, etc. to the sides of the cut-out 60 where the bead may be of lower height or omitted.

The bird feeder of the present invention can be easily assembled and positioned in the feed position by clamping the collar 36 onto the post 34 and thereafter sliding the tray downwardly in contact therewith. Thereafter the collar 55 is clamp positioned on the post 34 and the cover 10 similarly positioned on the member 34 and supported in the intended position by its contact with the collar 55. Obviously, the collar 55 may require vertical adjustment to achieve the desired near contact between the edge 50 and the rim 18. Thereafter, if desired, an upper clamp 56 as previously explained can be utilized to assure that the cover 14 will not vertically lift from the tray 12. While in the description of this invention the member 34 has been referred to or shown as a rod or a pole, it should be brought out that such could be any suitable connecting member, that the connecting member could be of multiple pieces so long as the desired relationship between the cover and tray is assured and that the member could either be ground supported as illustrated or could be suspended from a tree or line.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird feeder comprising a seed tray having a seed distribution and bird feeding surface, a peripheral surface surrounding said feeding surface and means for mounting said tray in a generally horizontal attitude, a cover forming a generally imperforate upper surface and including at least one downwardly extending wall portion terminating in a lower terminal edge, said cover position above said seed tray with said terminal edge thereof superposed and in proximal or contacting relationship such that access to birds, wind and the like between such opposed surfaces is essentially prevented with respect to said seed tray peripheral surface, said cover including a bird access opening formed in said cover at one side thereof, said cover supported for free rotational movement with respect to said tray such that said access opening is positionable on the downwind side of said feeder when in use position.

2. The bird feeder of claim 1, said feeding surface being a generally planar, generally circular tray with an upstanding downwardly curved circumferential lip defining said peripheral surface.

3. The bird feeder of claim 2, said lip of a relatively wide smoothly curved configuration so as to discourage large birds from grasp perching thereon.

4. The bird feeder of claim 1, said cover terminal edge defining a circle or at least a portion thereof.

5. The bird feeder of claim 4, said bird access opening being an extensive cut-out portion extending through said cover wall portion and of chordal configuration.

6. The bird feeder of claim 5, the upper part of said cut-out defining said bird access opening including a horizontally outwardly extending rim.

7. The bird feeder of claim 1, said cover being of a generally dome-shape and said bird access opening being a chordal shaped cut-out portion thereof and of a vertical extent to permit direct flight small bird access but deny large bird access to said feed tray.

8. The bird feeder of claim 7, said cutout of a circumferential extent which is about 180° or less and of an equal vertical dimension throughout such extent.

9. The bird feeder of claim 1, said mounting means including a vertically oriented member from which said tray is supported so as to vertically position such, said member in turn supporting said cover for rotational movement with respect to said member and said tray.

10. The bird feeder of claim 9, said member including a relatively stiff rod extending through both said tray and said cover.

11. The bird feeder of claim 10, said cover frictionally freely rotatably supported on said tray essentially solely by the weight thereof.

12. The bird feeder of claim 9, said tray and said cover independently suported by said member, said member including a pair of vertically spaced collars upon which said tray and said cover are supported.

13. The bird feeder of claim 12, said collars being adjustably clamped to a rod extending through openings in both said tray and said cover.

14. The bird feeder of claim 2, said feeding surface disposed entirely below said upstanding peripheral surface, said circumferential lip being continuous.

* * * * *